United States Patent [19]

Jewell et al.

[11] Patent Number: 5,667,637
[45] Date of Patent: Sep. 16, 1997

[54] PAPER AND PAPER-LIKE PRODUCTS INCLUDING WATER INSOLUBLE FIBROUS CARBOXYALKYL CELLULOSE

[75] Inventors: Richard A. Jewell, Bellevue; David W. Park, Puyallup, both of Wash.

[73] Assignee: Weyerhaeuser Company, Federal Way, Wash.

[21] Appl. No.: 552,419

[22] Filed: Nov. 3, 1995

[51] Int. Cl.$^6$ .................................................... D21H 11/20
[52] U.S. Cl. .................. 162/146; 162/157.6; 162/164.3; 162/164.6; 162/168.2; 162/175
[58] Field of Search ........................... 162/146, 9, 157.6, 162/164.3, 164.6, 168.2, 175, 169

[56] References Cited

FOREIGN PATENT DOCUMENTS 1932753  1/1970  Germany .

OTHER PUBLICATIONS

Baker, D.L. and O Sepall. A New dimension in papermaking—carboxyethylation. *Pulp and Paper Magazine of Canada*, pp. T–499 to T–455 (Sep. 1965).

Burova, T.S., N. A. Guseinova, A. S. Bokova, and N. F. Gracheva. Carboxyethylation of cellulose and investigation of the properties of the resulting ether. *Leningrad Tekhnol. Inst. Tsellyul.–Bumazh. Prom.* No 30, pp. 61–70 (1970). (Translation).

Kapustova, J. and A. Letenay. Modification of paper properties by the use of chemically modified pulps. *Papir Celuloza* 25 (6): 171–174 (1970). (Abstract from *Abstract Bulletin of the Institute of Paper Chemistry* 41:6461 (1971)).

Letenay, A. Chemically modified pulps for papermaking. *Sb. Vyskum. Prac. Odboru Papiera Celulozy* 13: 81–90 (1968). (Abstract from *Abstract Bulletin of the Institute of Paper Chemistry* 40:5749 (1970)).

Neogi, A. N. and Jon R. Jensen. Wet strength improvement via fiber surface modification. *Tappi* 63 (8): 86–88 (1980).

Walecka, Jerrold A. An investigation of low degree of substitution carboxymethylcelluloses. *Tappi* 39 (7):458–463 (1956).

Ward, Jr., Kyle. *Chemical modification of papermaking fibers*, pp. 86–103 and 108–114, Marcel Dekker, New York (1973).

Wågberg, Lars and Mirjam Björkland. On the mechanism behind wet strength development in papers containing wet strength resins. *Nordic Pulp and Paper Research Journal*, No. 1, pp. 53–58. (1993).

*Primary Examiner*—Peter Chin

[57] ABSTRACT

The invention relates to paper and similar products made with at least a portion of the papermaking furnish being essentially water insoluble carboxyethyl cellulose fibers. A cationic additive material, such as a polyamide epichlorohydrin wet strength resin or cationic starch, is also required. From 2–100% of the modified fiber is used in conjunction with a usual papermaking fiber. The D.S. of the carboxyethylated fiber is in the range of about 0.01–0.3, preferably about 0.025–0.10. A notable feature of paper products made with the fiber/cationic additive system is an improved ratio of wet to dry tensile and burst strengths compared with sheets made from unmodified fiber.

10 Claims, 11 Drawing Sheets

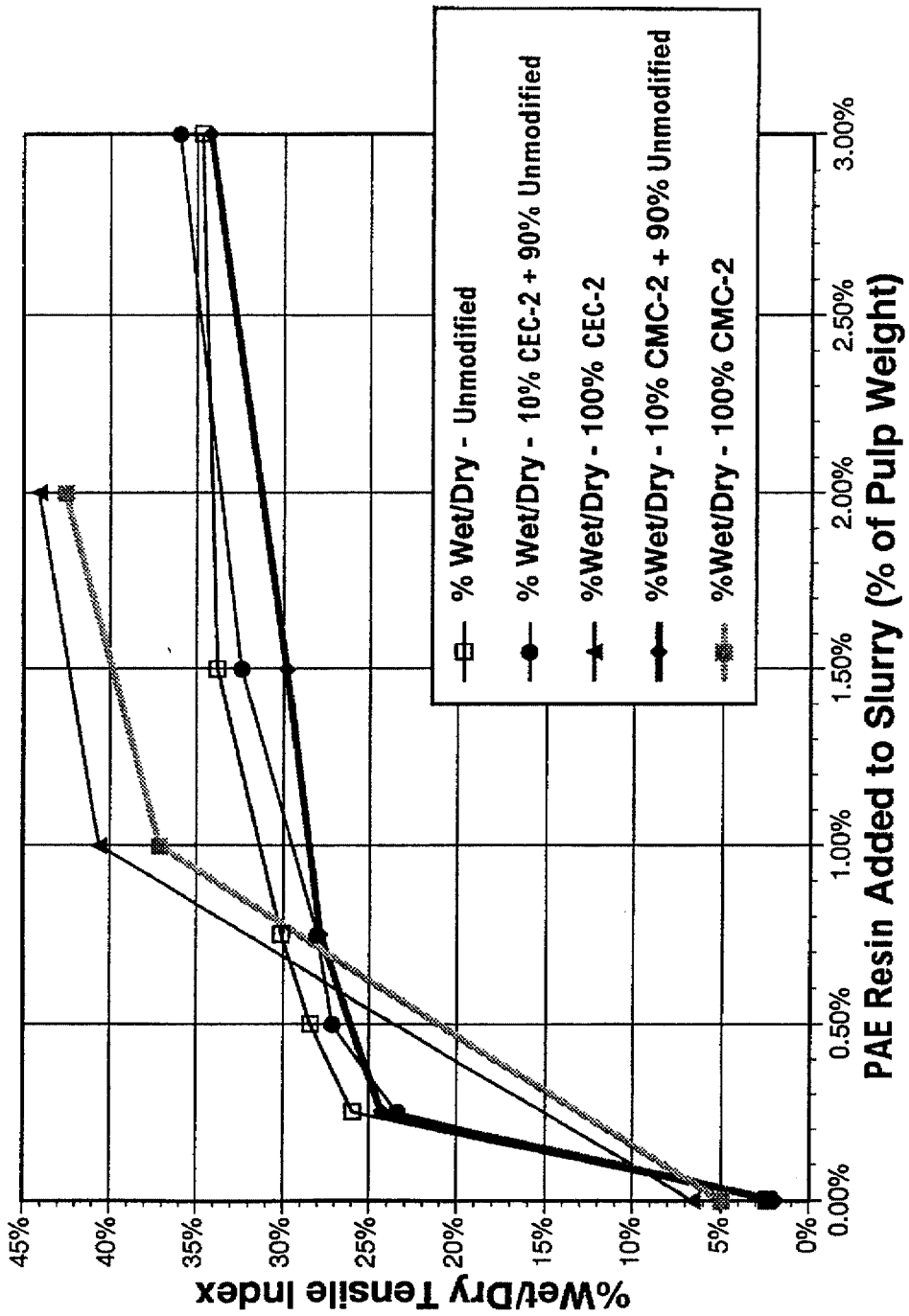

PAPER AND PAPER-LIKE PRODUCTS INCLUDING WATER INSOLUBLE FIBROUS CARBOXYALKYL CELLULOSE

The present invention relates to paper and paper-like products in which at least a portion of the furnish comprises an essentially water insoluble carboxyalkyl cellulose used in conjunction with a cationic additive.

BACKGROUND OF THE INVENTION

Fibrous carboxyalkyl cellulose derivatives having a sufficiently low degree of carboxyalkyl substitution (D.S.) so that they are essentially water insoluble have been known for many years. The carboxymethyl and carboxyethyl cellulose derivatives of this type have been the principal compositions investigated. These materials have been considered as paper making fibers although their usage has not been extensively investigated.

Walecka, in an article in *Tappi*, 39 (7): 458–463 (1956), describes a method for making carboxymethylated cellulose in the D.S. range of 0.006–0.62. Freeness of a water suspension of his carboxymethylated fibers at a given beating time was seen to decrease with increasing D.S. Bursting, tensile strength, and zero span tensile strength of handsheets made at a given beating time increased with increasing D.S. while opacity was observed to decrease. In summary, the author noted that the modified fibers were easier to fibrillate both internally and externally during beating and tended to form sheets with superior strength properties.

Baker and Sepall, *Pulp and Paper Magazine of Canada*, pp T-449 to T-455 (September, 1965) describe low D.S. carboxyethylation of wood pulps and other cellulosic materials. They reacted the cellulosic material with varying amounts of acrylamide and sodium hydroxide at relatively high consistency in an aqueous environment. The resulting pulps were described as "carbamylethyl-carboxyethyl derivatives with the pre-dominating substituent determined by caustic concentration". Higher caustic concentrations favored formation of the carboxyethyl derivative. The authors concluded that it was only the carboxyethyl substituent that affected papermaking properties and their reported D.S., which ranged between about 0.02–0.21, referred only to this group. Increasing carboxyethylation had a positive effect on bursting strength but a negative effect on unbeaten freeness and tear strength. Bulk was generally increased as D.S. increased. The higher D.S. pulps, those in the range of 0.18 were particularly noted, tended to be quite slimy feeling in aqueous slurries. The authors found it surprising that the modified pulps produced "strong paper of unusually low density" and particularly mentioned the apparent ability to repulp and reform previously dried sheets without significant loss of strength.

Burova et al., *Leningrad Tekhnol. Inst. Tsellyul.-Bumazh. Prom.*30: 61–70 (1970), investigated conditions for preparation of low D.S. carboxyethyl cellulose. They confirmed the observations of Baker and Sepall that increasing concentrations of caustic directed the reaction to carboxyethyl substitution rather than carbamoylethyl. They further agreed that this latter substituent did not affect papermaking properties of the unreacted fiber. Handsheets formed from fibers with varying degree of substitution led them to the observation that any significant change in the mechanical properties of paper were not seen until carboxyethyl substitution was significant, in their case about 0.056, the highest D.S. they achieved. Fold, burst, and water absorption capability (hydrophilicity) were improved over untreated fiber, bulk was also increased, but tear strength dropped. The authors also noted the easier beating properties and retention of strength after repulping that had been seen by Baker and Sepall.

German Offenlegungssehrift 1,932,753 describes absorptive paper products made using a blend containing a predominant mount (at least 50%) of relatively low D.S. insoluble carboxymethyl cellulose fibers and a wet strength additive. The addition of more than 50% untreated fibers was said to degrade the properties very significantly. While carboxyethyl cellulose was mentioned as one of a large family of substituted cellulose products that might be suitable there were no examples of its use or of any of the many other suggested materials other than carboxymethylated fibers. A fairly high degree of carboxymethyl substitution appeared to be necessary to gain the improved properties claimed. A D.S. greater than 0.05 was required, preferably greater than 0.10. In some examples a D.S. as high as 0.20 appeared to work best. Various conventional wet strength resins were suggested for use with the fiber. These included urea formaldehyde and melamine urea formaldehyde types, with polyethyleneimine and polyamide epichlorohydrin resins being preferred. Paper towels and wet wipes were among the products suggested.

Neogi and Jensen, *Tappi* 63 (8): 86–88 (1980), note that a higher degree of ionic bonding of positively charged (cationic) additives can be effected in papers by introduction of "large mounts of negatively charged fibers such as carboxymethyl cellulose". In one example, 5% CMC, incorporated with an unbleached kraft pulp along with a polyethyleneimine wet strength additive, increased wet tensile strength by a factor of 2 over a similar material lacking the carboxymethylated material. However, the CMC used had a D.S. of 0.7 and would appear to be a water soluble material and not one that would remain in fibrous form. Additionally, the authors note that the polyethyleneimine in aqueous solution was sprayed onto the surface of previously formed sheets rather than by the more standard practice of being incorporated into the furnish before sheeting.

Wagberg and Bjorkland, *Nordic Pulp and Paper Research Journal*, No. 1, pp 53–58 (1993), also studied the use of low D.S. carboxymethylated fibers with wet strength enhancers. They prepared substituted fibers in a D.S. range of 0.016–0.126 using the method of Waleeka cited above. Wet and dry tensile strengths were the principal sheet properties investigated. These were studied at various fiber D.S. levels and various levels of added polyamide epichlorohydrin (PAE) wet strength additive. It was noted that higher D.S. fiber absorbed greater amounts of PAE resin but that both wet and dry tensile index leveled off at a D.S. of about 0.07. This was believed due to a higher degree of swelling of the higher D.S. fibers that permitted the resin to enter the interior of the fibers where it would not be effective. At a constant PAE addition of 4 kg/t, dry tensile index increased roughly linearly with increasing D.S. This was also the case for a control set in which no PAE had been added. Wet tensile index followed a similar pattern of increasing strength as D.S. increased for the sheets with the added PAE. However, little or no increase was observed in the comparison set made without the wet strength additive. The wet tensile index values of sheets with the PAE resin were significantly higher than those lacking the additive. The authors noted that dry tensile index is affected by both D.S. of the fibers and the addition of PAE but that the effect of change in D.S. is greater than the effect of change in the amount of wet strength resin used. In conclusion they stated that an increase in the carboxyl group content led to an increase in the ability to absorb wet strength resins and that a chemical reaction probably took place between them. They further concluded that the added carboxyl groups enhanced the efficiency of the wet strength resin.

Ward, in his book *Chemical modification of Papermaking Fibers*, Marcel Decker, Inc., New York (1973), quotes extensively from the Waleeka and Baker and Sepall papers just noted. He further cites Kapustova and Letenay, *Papir Celuloza* 25 (6):171–174 (1970) [*Abstract Bulletin of the Institute of Paper Chemistry*, 41: 6461 (1971)] on the use of CMC in pulp sheets. In one case 1–5% CMC (apparently a water soluble type) was precipitated on prehydrolyzed kraft pulp fibers by alum prior to beating. Refining properties, breaking length, bursting strength, and folding endurance were said to be improved. In another example, high wet strength was achieved in sheets made of low substituted (water insoluble) CMC. Ward further cites Letenay, *Sb. Vyskum. Prac. Odboru Papiera Celulozy* 13: 81–90 (1968) [*Abstract Bulletin of the Institute of Paper Chemistry*, 40: 5749 (1970) who added up to 10% of hydrophilic cellulose derivatives as additives to a spruce kraft pulp. These additives included carboxymethyl and carboxyethyl cellulose. Refining properties were initially improved with use of the additives. Handsheets made from pulp to which 10% CMC had been added showed an increase in fold endurance but reduced breaking length and burst compared to sheets lacking the modified fiber.

While it would be anticipated that insoluble carboxymethylated and carboxyethylated fibers of similar carboxyl equivalent would behave in similar fashion, the present inventors have unexpectedly found that this not the case. Surprisingly, no one until the present has discovered the benefits and the very significant product advantages obtained by the use of carboxyethylated fibers as at least a portion of a papermaking furnish when used in conjunction with various cationic additive materials.

SUMMARY OF THE INVENTION

The present invention is concerned with the use of essentially water insoluble carboxyalkyl cellulose fibers as at least a portion of a papermaking furnish. The carboxyalkyl cellulose fibers are used in conjunction with a cationic papermaking additive. The alkyl group of the carboxyalkyl cellulose fiber must be at least two carbons in length but may be longer. As one example, carboxypropyl cellulose should be considered to be within the scope of the invention. The carboxyalkyl substituent group on the cellulose is preferably carboxyethyl and will be present in a relatively low degree of substitution; i.e., within the range of 0.01 to 0.3, preferably in the range of 0.02 to 0.15 and most preferably in the range of about 0.025 to 0.10. Fibers having relatively strongly acidic substituent groups with a pKa below about 4.0, such as carboxymethyl cellulose, are not considered to be within the encompass of the present invention.

By "essentially water insoluble" is meant a fiber that has less than about 10% solubility in water at 20° C. preferably less than about 5%. By "fibrous" is meant that the carboxyalkyl cellulose permanently retains a physical form closely similar to that of the original cellulose from which it was prepared even when in a hot aqueous environment.

The fibrous portion of the paper or paper-like products made using the invention may contain as little as 2% by weight or in some cases as much as 100% by weight of the carboxyalkylated fiber. The balance of the fiber may be any cellulosic fiber such as bleached or unbleached wood pulps, cotton linters, rag stock, or similar papermaking fibers. The term "paper or paper-like" should be read sufficiently broadly to to include such sheeted products as linerboard or corrugating medium, fine papers, toweling, tissue, wipes, and the family of similar and related products. The product of a carboxyalkyl cellulose and cationic wet strength additive is particularly advantageous when used in disposable paper towels.

Various cationic papermaking additives intended to induce such properties such as wet or dry strength or sizing are used in conjunction with the carboxyalkyl cellulose fibers or fiber mixtures. Exemplary of these additives are polyamide epichlorohydrin (PAE) and polyethyleneimine (PEI) wet strength resins and cationic starch intended primarily to induce dry strength and good surface properties. Other similar cationic additives should be considered to be within the encompass of the invention. These may be used in varying amounts but are generally present in the range of 0.10–4.0% by weight, preferably 0.25–4.0%, based on the total amount of fiber present in the furnish.

It is an object of the present invention to provide a paper or paper-like product having improved properties achieved through inclusion of carboxyalkyl cellulose fibers in the furnish.

It is another object to provide paper or paper-like products including essentially water insoluble carboxyalkyl cellulose fibers along with a cationic additive.

It is a further object to provide paper products having enhanced ratios of wet to dry burst and tensile strength.

It is an additional object to provide paper or paper-like products that employ essentially water insoluble carboxyethyl cellulose fibers along with a cationic additive material in a papermaking furnish.

These and many other objects will become readily apparent to those skilled in the art upon reading the following detailed description taken in conjunction with the drawings.

BRIEF DESCRIPTION OF THE DRAWINGS

FIG. 11 is a graph, similar to FIGS. 9 and 10, showing the ratio of wet to dry tensile index for one each of the CEC and CMC pulps, and 10% blends of these fibers with untreated pulp, compared with untreated fiber, all refined to 475 CSF, at various levels of PAE wet strength resin addition.

DETAILED DESCRIPTION OF THE PREFERRED EMBODIMENTS

Figure 1:
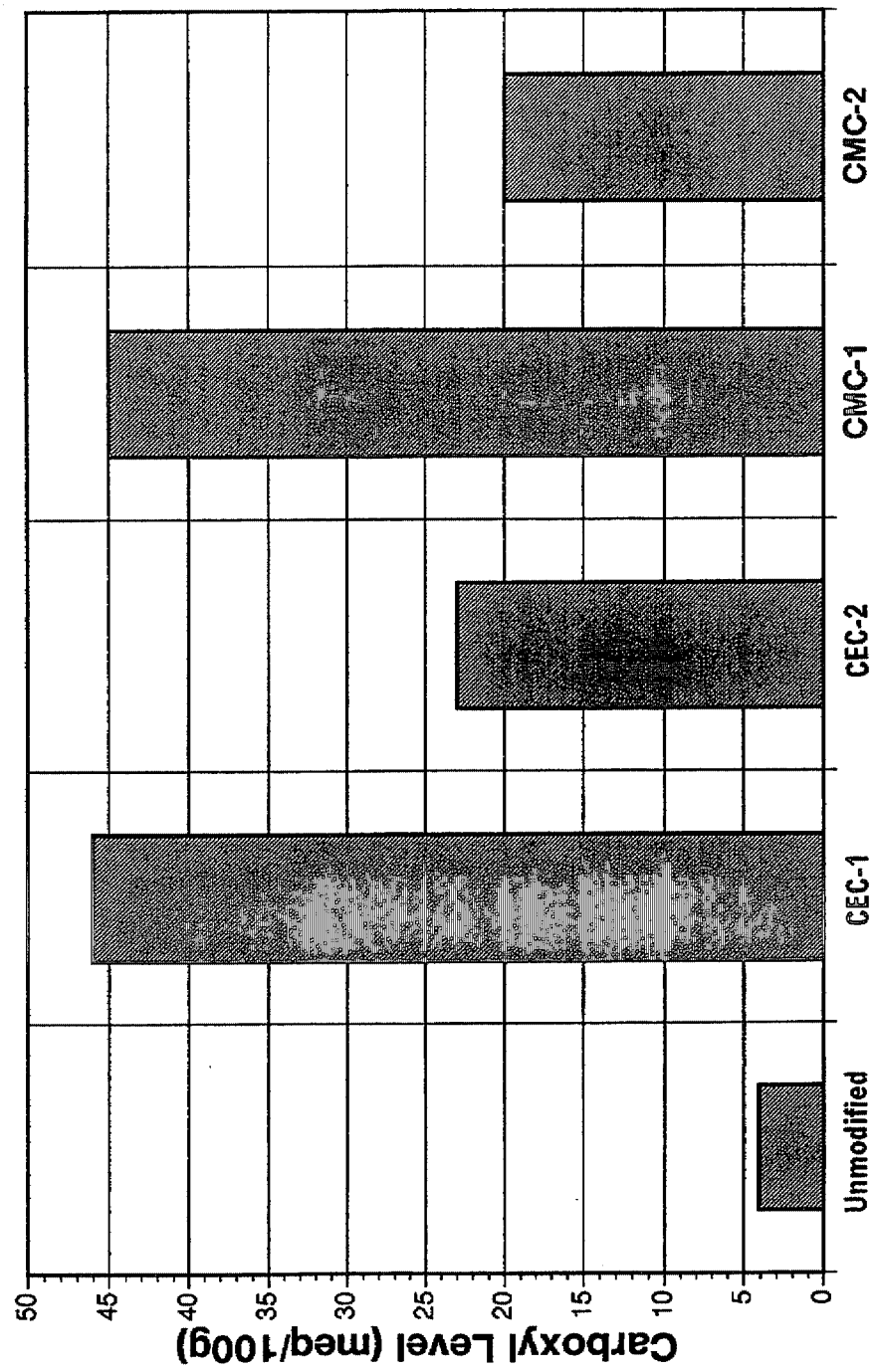
FIG. 1 is a bar graph comparing carboxyl levels of two fibrous carboxyethyl cellulose (CEC) pulps with two carboxymethyl cellulose (CMC) pulps and untreated fiber.

Methods for preparation of carboxyethyl cellulose usually involve reaction under aqueous alkaline conditions with acrylamide; e.g. as shown by Burova et al. or Baker and Sepal, cited earlier. The reaction products are carbamoylethyl cellulose, Cell—O—$C_2H_4CONH_2$, and carboxyethyl cellulose, Cell—O—$C_2H_4COO$–$Me^+$, where $Me^+$ would typically be sodium. As alkali concentration is increased the reaction is driven more to the latter product. Both of the authorities just noted comment that it is the carboxyethyl substituent, rather than the carbamoylethyl substituent, that affects papermaking properties. Thus, where D.S. is cited in the following examples it refers only to the carboxyethyl component unless otherwise stated. Another convenient and probably more meaningful way of expressing substitution is by reference to carboxyl equivalent. This is a particularly useful means of expression when different substituents are compared; e.g., carboxymethyl vs. carboxyethyl.

As alternative methods of preparation of carboxyethyl cellulose, 2-hydroxyethyl acrylate or acrylonitrile may be employed in place of acrylamide.

The following examples will describe in detail the preparation of the various cellulose derivatives to be referred to later.

EXAMPLE 1

Preparation of Carboxyethyl Cellulose Fiber Having 49.0 meq/100 g of Carboxyl

Into a double planetary Ross mixer (approximately 8 L capacity, Model LDM-2, available from Charles Ross & Son Co., Hauppauge, New York) was placed 607 g never dried GPS softwood pulp at 42.3% consistency (257 g on an oven dry basis). GPS (Grand Prairie Softwood) is a Canadian bleached kraft wood pulp made from a mixed furnish predominantly of white spruce, lodgepole pine, and balsam fir, the spruce being the major component. Then 130 mL of 20% aqueous NaOH (25.9 g NaOH) was added to the mixer on top of the moist pulp. Following that, 64.5 g acrylamide was added. The mixture was stirred and brought up to a temperature of 40°–45° C. within 10 minutes and held there for an hour. Indirect steam heat was used. The temperature was then raised to 70°–75° C. for 2 hours. Again the temperature was raised over about 10 minutes to 90.5° C. and after heating for an additional 15 minutes to 97° C. The steam heat was then turned off but stirring was continued for an additional 1½ hours. The product was collected and washed four times with deionized water. The pH of the final wash was about 8.0. Analysis showed the product to contain 49.0 meq carboxyl groups/100 g of product and 0.40% nitrogen. Total degree of substitution (carboxyl plus nitrogen) was 0.126 and carboxyethyl substitution approximately 0.075. This sample will hereafter be referred to as CEC-1.

EXAMPLE 2

Preparation of Carboxyethyl Cellulose Fiber Having 23.6 meq/100g of Carboxyl

In similar fashion to Example 1, 686 g of never dried GPS fiber at 39.2% consistency (269 g oven dry basis) was added to the Ross mixer and 130 mL of 20% NaOH (27.1 g NaOH) was added on top of the pulp. Then 13.45 g acrylamide was added to the mixture. The heating times and temperatures were similar to those of the previous example. The reaction product was light yellow in color with an ammonia smell. It was washed five times in deionized water until the pH of the final filtrate was about 8.0. Analysis showed the product to contain 23.6 meq carboxyl/100 g pulp and 0.038% nitrogen. The total degree of substitution was 0.042 and the estimated D.S. of carboxyethyl was 0.037. This sample will hereafter be referred to as CEC-2.

EXAMPLE 3

Preparation of Carboxymethyl Cellulose Fiber Having 46.3 meq/100 g of Carboxyl

For comparison with the carboxyethyl cellulose of Example 1 (CEC- 1 ), a sample of carboxymethylated fiber of comparable carboxyl equivalent was prepared using the method of Walecka cited earlier. A 1 kg portion of never dried bleached GPS softwood fiber was pressed to increase the consistency to over 40% and solvent displacement dried according to the following procedure. The wet pressed pulp was first soaked overnight in 2 L of methanol. Methanol was drained by vacuum filtration and the pulp was then soaked in 1 L of flesh methanol for about two hours. Solvent was again removed and the pulp soaked in 1 L of fresh methanol for 2 hours. Following vacuum filtration on a Buchner funnel to remove as much methanol as possible the pulp was then soaked in 2 L of toluene for about two hours. Solvent was removed as above and the pulp was soaked in 1 L of fresh toluene for approximately an hour. Following solvent removal the pulp was air dried overnight then oven dried at 100° to 105° for about 4 hours. About 230–240 g of dried pulp was obtained To prepare the carboxymethylated pulp, 20.0 g of monochloroacetic acid was dissolved in 1 L of isopropanol. Then 124 g of the solvent dried pulp was added and allowed to remain for two hours. A solution of 17.1 g NaOH in 350 mL methanol and 2500 mL isopropanol was made and heated to boiling. The pulp in the chloroacetic acid solution was added and heating maintained to keep the reaction mixture at or near boiling for another two hours. The mixture was then allowed to cool and the solvent decanted off. The reacted pulp was then soaked in 4 L of deionized water containing 20 mL of acetic acid for about an hour. Wash water was filtered off on a Buchner funnel and the carboxymethylated fiber was washed four more times with deionized water. Carboxyl level of the fiber was measured as 46.3 meq/100 g, closely similar to that of sample CEC-1, and D.S. was estimated from carboxyl content as 0.075. This sample will hereafter be referred to as CMC-1.

EXAMPLE 4

Preparation of Carboxymethyl Cellulose Fiber Having 19.3 meq/100 g of Carboxyl For comparison with the carboxyethyl cellulose of Example 2 (CEC-2), a sample of carboxymethylated fiber of comparable carboxyl equivalent was prepared in similar manner to that of Example 3. A 125 g portion of the solvent dried pulp was added to a solution of 6.0 g monochloroacetic acid in 1 L isopropanol and allowed to remain overnight. This was added to a boiling solution of 11.2 g of NaOH in 350 mL methanol and 2500 mL isopropanol. The reacted fiber was then washed as described above. Carboxyl level was measured as 19.3 meq/100 g, very slightly less than that of sample CEC-1. The D.S., estimated from carboxyl content, was about 0.031. This sample will hereafter be referred to as CMC-2.

EXAMPLE 5

Preparation of Handsheets

About 30–31 g of the pulp was refined in A PFI Refiner to the desired freeness as measured by the Canadian Standard Freeness (CSF) test. The refiner was designated a No. 138 and is manufactured by P.F.I. Mølle, Hamjern, Oslo, Norway. The freeness tester is manufactured in Canada by Robert Mitchell Company, Ltd., Ste. Laurent, Quebec. The refined pulp was then placed in a disintegrator for 10,000 revolutions to obtain a uniform slurry. The pulp slurry was then diluted to 10 L and consistency determined. The disintegrator is a British Pulp Evaluation Apparatus, manufactured by Mavis Engineering, Ltd., London, England. All three machines are also available from Testing Machines Inc., Amityville, N.Y.

Where a cationic wet strength additive was desired, the product chosen was Kymene 557H, a water soluble polyamide epichlorohydrin (PAE) reaction product. Kymene is a trademark of Hercules, Inc., Wilmington Del. The Kymene 557H is supplied as a 12.5% solids aqueous solution. The use of this particular product should not be considered as an endorsement or limitation since similar products are available from other suppliers and would be expected to perform in an equally satisfactory manner. For use, the Kymene as received was diluted to a 1% solids solution. PAE resin was added to the pulp slurry with continuous stirring in the desired amount. Stirring was continued for at least 15 minutes before any sheets were made.

Handsheets were formed in a conventional manner in a sheet mold that produced sheets 152 mm (6 in) in diameter. White water from the sheet mold was recycled as dilution water for subsequent sheets to better simulate commercial operating conditions. The first seven sheets made were discarded to allow white water fines to build up to an equilibrium level. Following that, the eighth sheet was used to check sheet weight and adjust amount of stock added in order to produce the desired 1.2 g (oven dry weight) sheets. Then 10 additional sheets were made for testing.

Following drying, the sheets were oriented on edge in a wire rack and placed in an oven at 100° C. for one hour to allow good curing of any wet strength resin. A number of samples were made using 100% modified carboxyethylated pulps as well as blends of these pulps with unmodified pulp. For most conditions, similar handsheet samples of the carboxymethylated pulps were made for comparison.

Physical properties of the various modified materials and blends are best understood by referring to the Figures. These will show the significant advantages of the carboxyethylated fiber in many important properties.

FIG. 1 is a bar graph showing the comparative carboxyl equivalent levels of the two carboxyethylated and two carboxymethylated materials of Examples 1–4. It can be readily seen that CEC-1 is at a nearly identical level with CMC-1 and CEC-2 is closely comparable with CMC-2. The unmodified pulp has only a very minor carboxyl availability. In the Baker and Sepall paper cited earlier the authors noted that "introduction of carboxyethyl groups, instead of carboxymethyl, into a wood pulp cellulose would be expected to have a similar effect [on strength properties]". Unexpectedly, the present inventors have found that this is not the case. In particular, the very important properties of wet and dry burst and wet and dry tensile strength are significantly better in sheets containing the carboxyethylated fibers and a wet strength resin than their carboxymethylated equivalents.

The reason for this behavior is not entirely clear. While the inventors do not wish to be bound by this explanation, on reflection it may be that the available carboxyl level may not be as important as the relative acidity of the carboxyl groups. Examination of pKa is informative. This is the approximate pH at which half of the carboxyl groups would be neutralized by a base. The pKa of the carboxyl groups on CMC is approximately 3.83 which indicates them to be quite strongly acidic. For comparison, acetic acid has a pKa of 4.75 and propionic acid a pKa of 4.87. In contrast to the carboxymethylated fiber, the pKa of carboxyethylated fiber is about 4.51 indicating it to be a significantly weaker acid. One might then surmise that at a given pH the carboxymethylated fibers would bind a cationic additive such as PAE more strongly than their carboxyethylated equivalent. In the case of fiber mixtures, the resin might then be less available to any unmodified fibers present resulting in reduced rather than enhanced wet strength. For the reasons set out here, the present invention will be considered as limited to those carboxyalkyl substituted fibers having a pKa greater than about 4.0.

Figure 2:
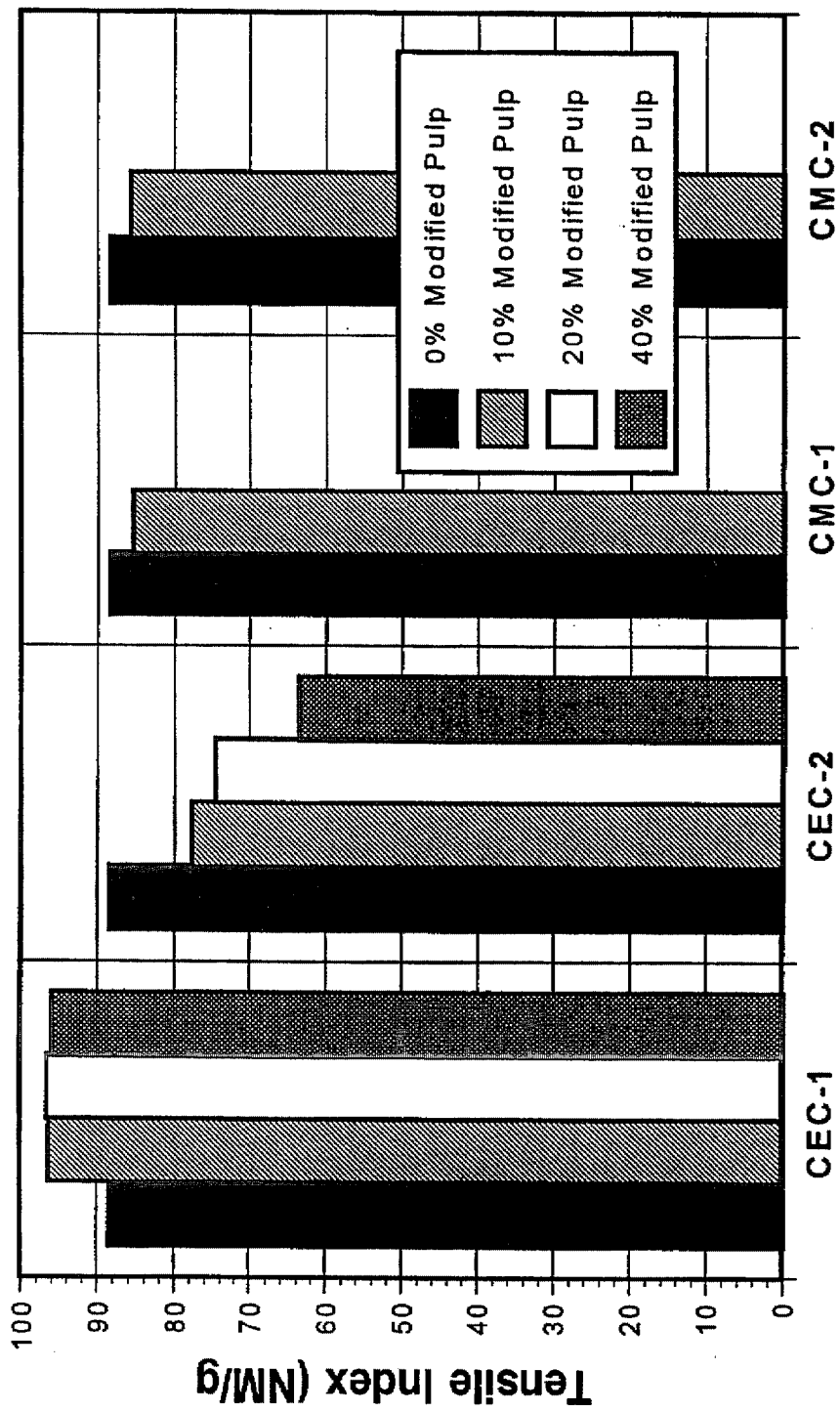
FIG. 2 is a bar graph showing tensile index of blends of the unrefined modified CEC and CMC pulps with untreated fiber refined to 475 Canadian Standard Freeness (CSF).

FIG. 2 shows tensile index values for blends of the two unrefined carboxyethylated pulps with untreated fiber using 0, 10%, 20%, and 40% of the treated pulp. Additional values are given for 0% and 10% blends of the two carboxymethylated samples. The untreated fibers in the blends were refined before blending to achieve a freeness of 475 CSF. All handsheets were minimally pressed to avoid densification during dewatering and drying.

In the case of CEC-1, the higher D.S. carboxyethylated fiber, the addition of as little as 10% of the treated fiber resulted in a significant increase in tensile strength of the sheets. This was not further improved by addition of higher percentages of modified fiber. However, the same pattern was not seen for the lower substituted CEC-2 where addition of the modified fiber reduced tensile index. In the case of CMC-1 and CMC-2, addition of 10% somewhat reduced tensile index. In both cases it was poorer than that achieved by the use of CEC-1.

Figure 3:
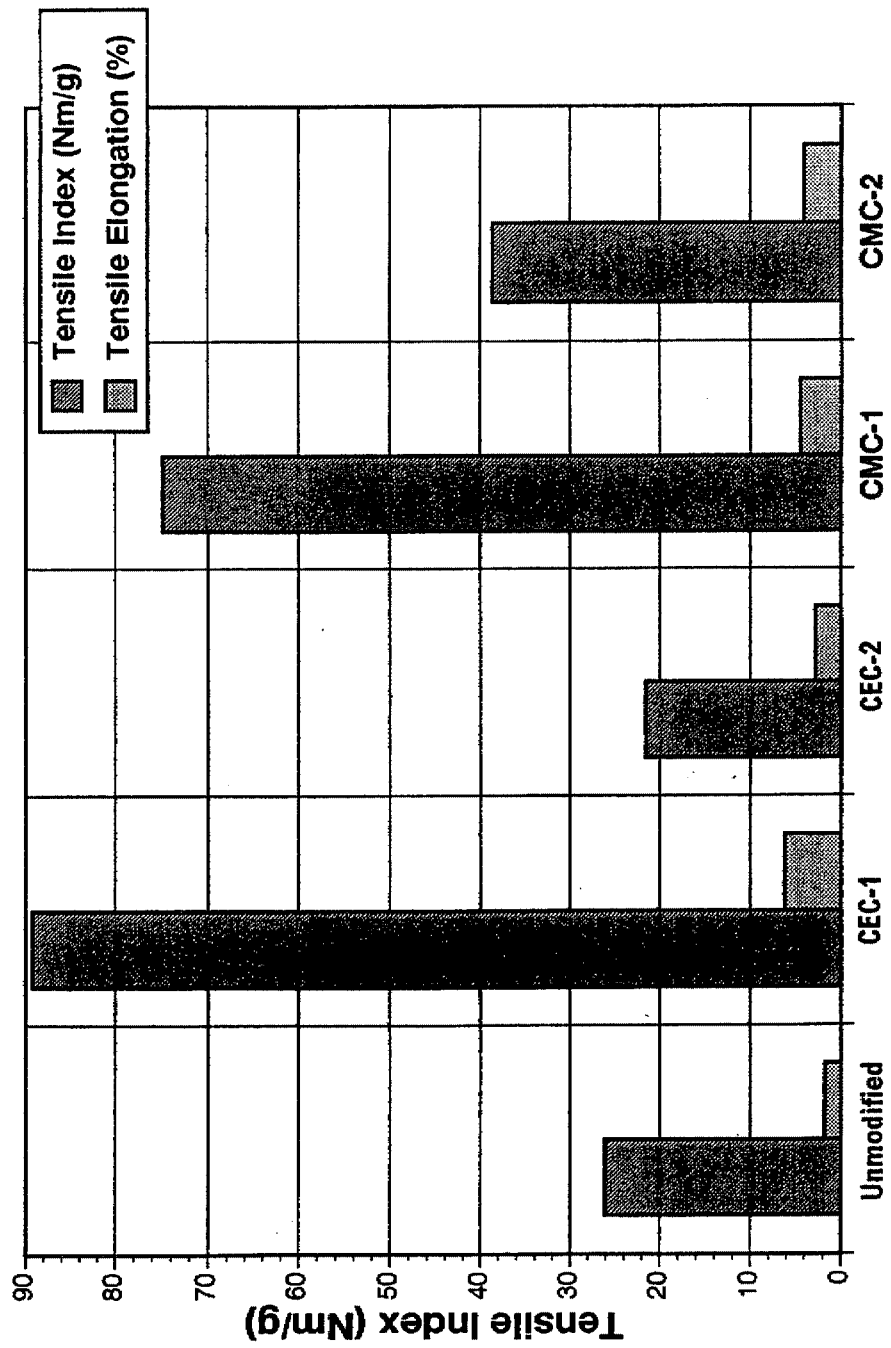
FIG. 3 is a bar graph showing tensile index and elongation of minimally pressed sheets of the unrefined modified CEC and CMC pulps and untreated fiber.

FIG. 3 indicates tensile index and elongation for the four modified pulps, again compared with untreated pulp as a control sample. Sheets were minimally pressed as was the case in the previous example. Both properties were dramatically increased by over 200% in the case of CEC-1. However, the lower degree of carboxyethylation of CEC-2 generally gave values similar to those of the unmodified pulp. In the case of CEC-2 elongation was increased but tensile index dropped about 15%. A generally similar pattern was seen with CMC-1 and CMC-2. The improvement in tensile of CMC-1 was less dramatic than its counterpart CEC-1 but CMC-2 gave a 50% increase. Elongation of both of the carboxymethylated pulps was intermediate between the two carboxyethylated materials.

Figure 4:
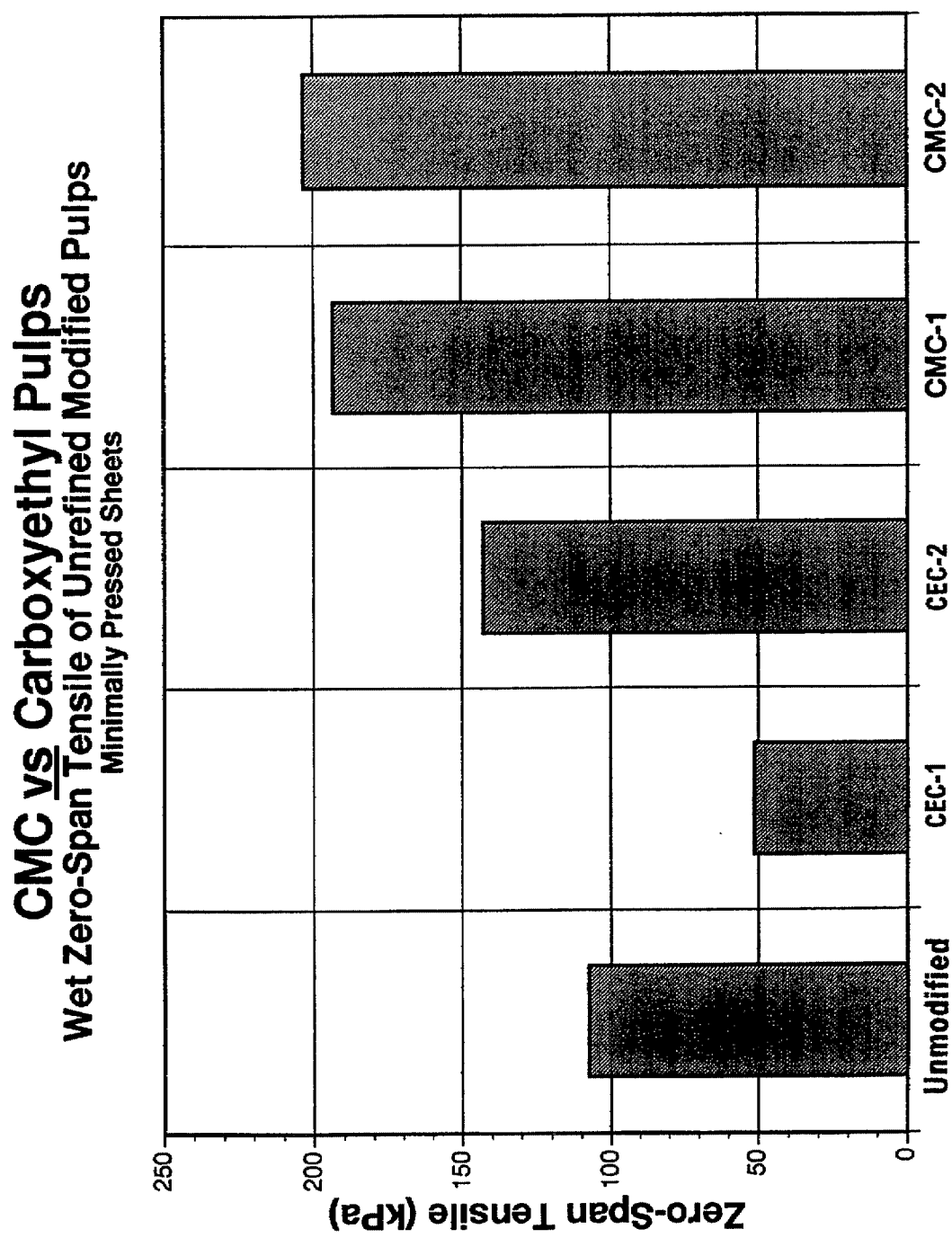
FIG. 4 is a bar graph showing zero span tensile strength of minimally pressed sheets of the unrefined modified CEC and CMC pulps and untreated fiber.

FIG. 4 shows wet zero span tensile values of the sheets of FIG. 3. Zero span tensile strength is considered to be an indication of individual fiber strength. Sample CEC-1 is reduced to about half of untreated fiber strength while CEC-2 is about 33% stronger. The two carboxymethylated fibers are approximately double the strength of the untreated fiber and higher than either of the carboxyethylated fibers.

Figure 5:
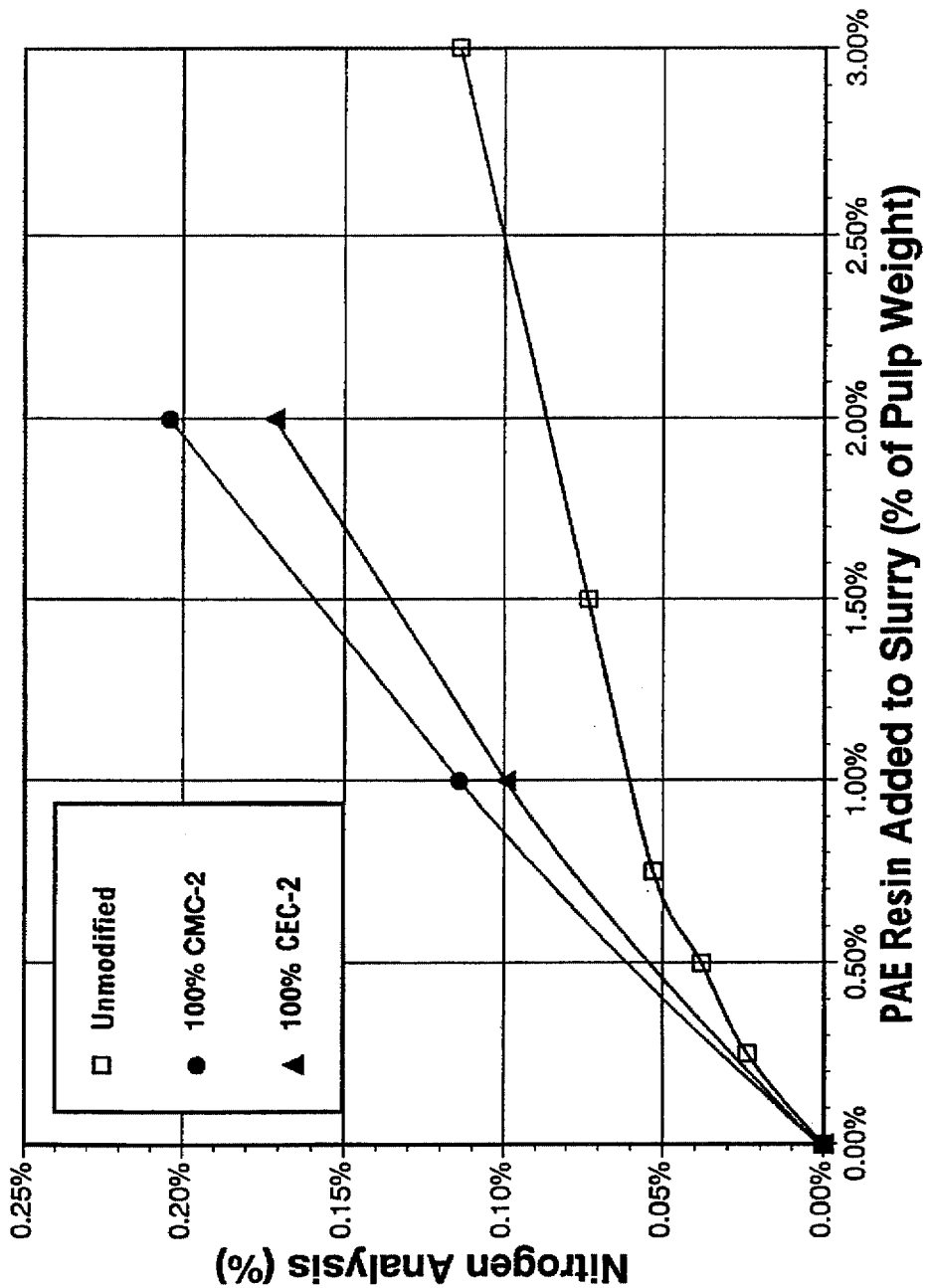
FIG. 5 is a graph showing retention of a polyamide epichlorohydrin (PAE) wet strength resin of one each of the CEC and CMC pulps compared with untreated fiber at various levels of PAE wet strength resin addition.

All of the strength properties above were measured in sheets without any additives and were indicative of certain properties that would affect performance as papermaking fibers. However, the sheets did not attempt to simulate any particular paper product. A very important and unexpected advantage of the carboxyethylated fibers is their performance with cationic additives such as PAE wet strength resins. It is here emphasized that the present invention is not directed to the carboxyethylated fibers themselves but to their combination with a cationic additive and/or their combination with untreated fibers. Their superior performance in products designed to more closely simulate actual paper products will be seen in the following Figures. In addition, the superiority of the carboxyethylated fiber over carboxymethylated fiber will become readily apparent FIG. 5 indicates PAE resin retention at different resin additions of the lower D.S. carboxyethylated and carboxymethylated pulps in comparison with that of an unsubstituted pulp. The handsheets were made by the procedure of Example 5 using Kymene 557H polyamide epichlorohydrin resin. It is readily apparent that both substituted pulps attract the PAE resin more aggressively than the untreated material. The carboxymethylated fibers held higher levels of the resin even though they had a slightly lower carboxyl equivalent than the equivalent carboxyethylated fiber. This was one of the observations that led to the hypothesis expressed earlier that the absolute level of carboxyl groups present might be less important than their relative acidity. Thus, when the most commonly anticipated use of the substituted fibers would be in blends with unmodified fiber, the low substituted CEC fibers might be expected to hold the PAE resin less tightly and make it more readily available to the unmodified fiber in the mixture.

Figure 6:
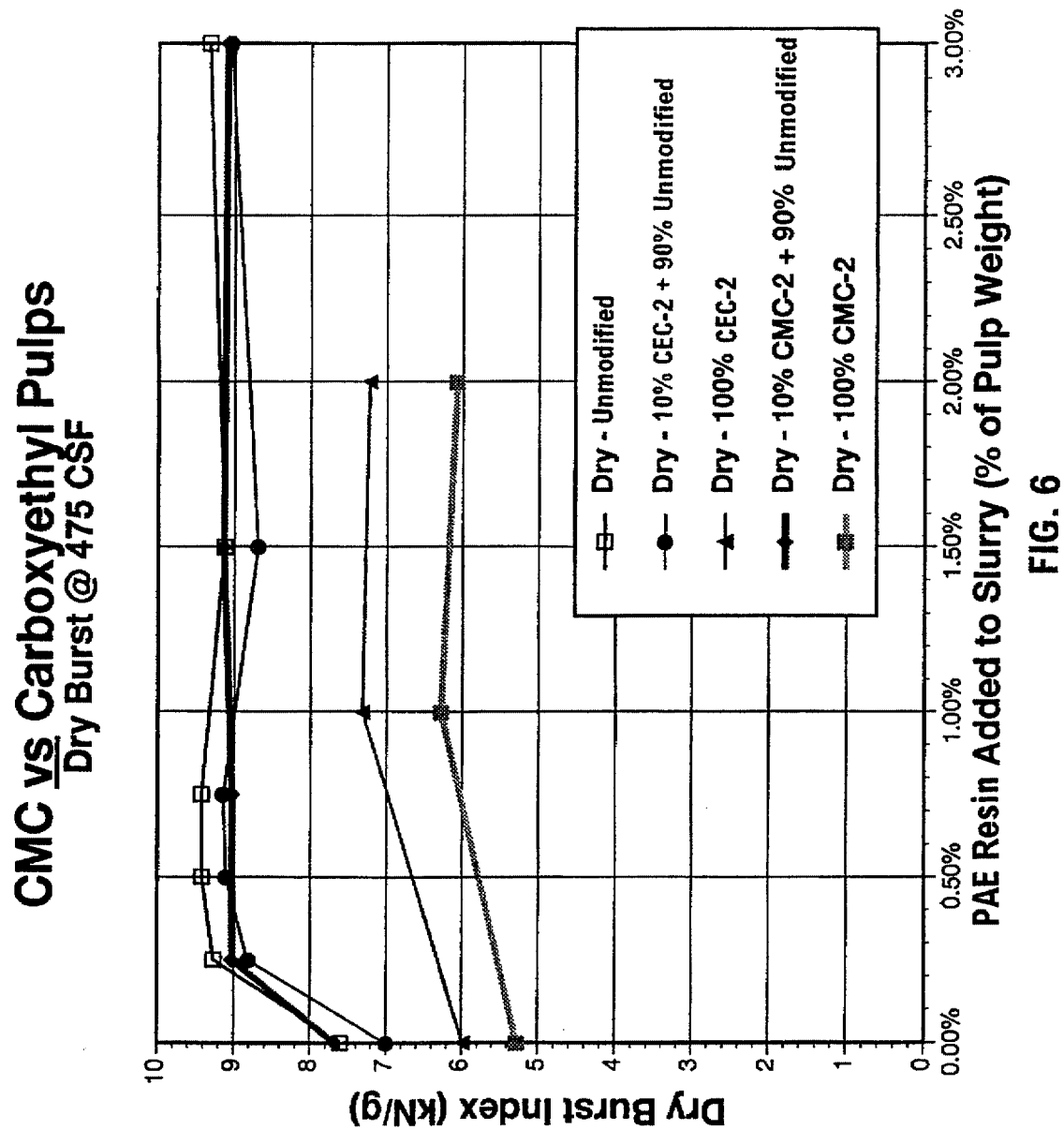
FIG. 6 is a graph showing dry burst strength of one each of the CEC and CMC pulps, and 10% blends of these fibers with untreated pulp, compared with untreated fiber, all refined to 475 CSF, at various levels of PAE wet strength resin addition.
Figure 7:
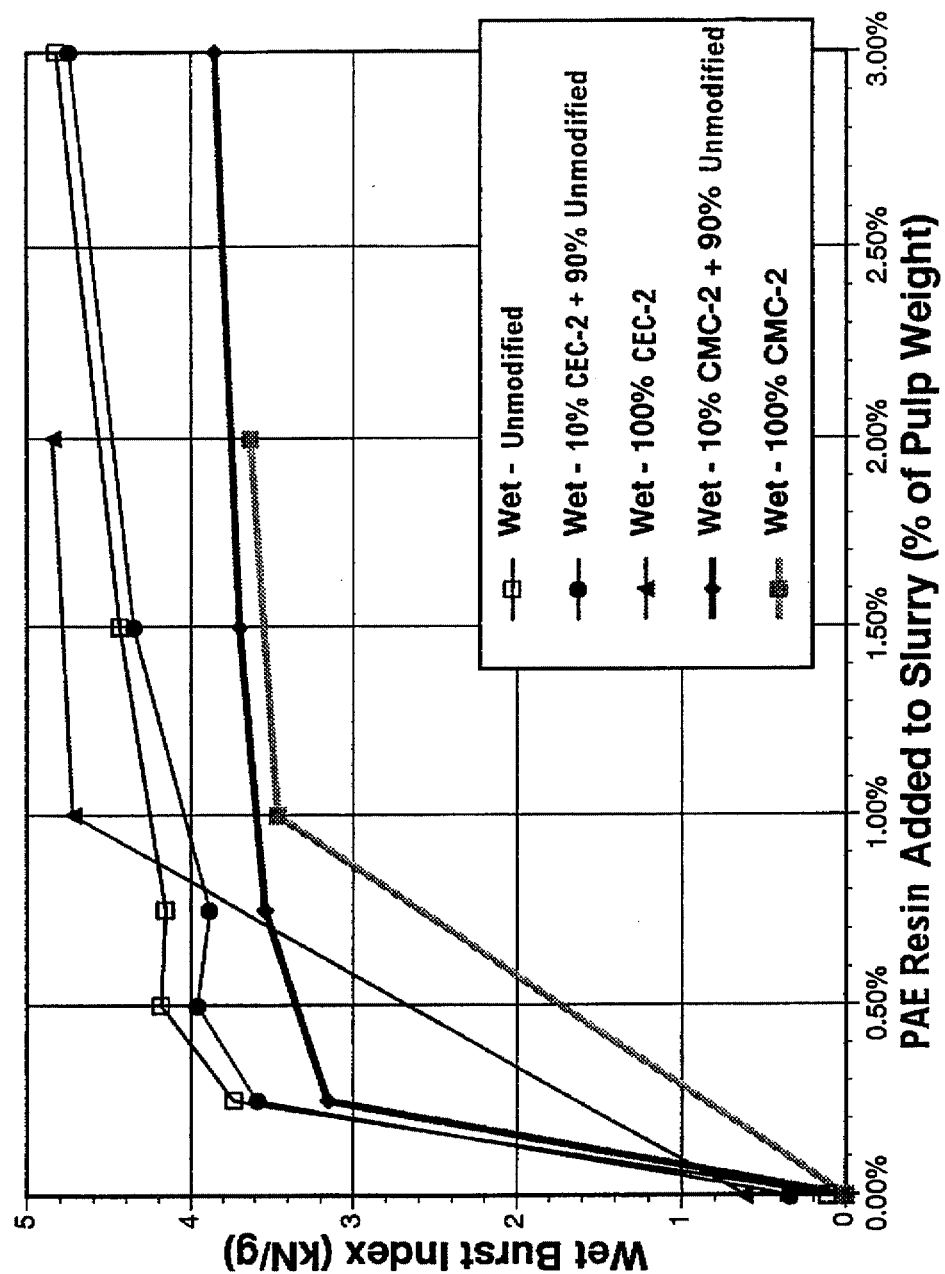
FIG. 7 is a graph, similar to FIG. 6, showing wet burst strength of one each of the CEC and CMC pulps, and 10% blends of these fibers with untreated pulp, compared with untreated fiber, all refined to 475 CSF, at various levels of PAE wet strength resin addition.
Figure 8:
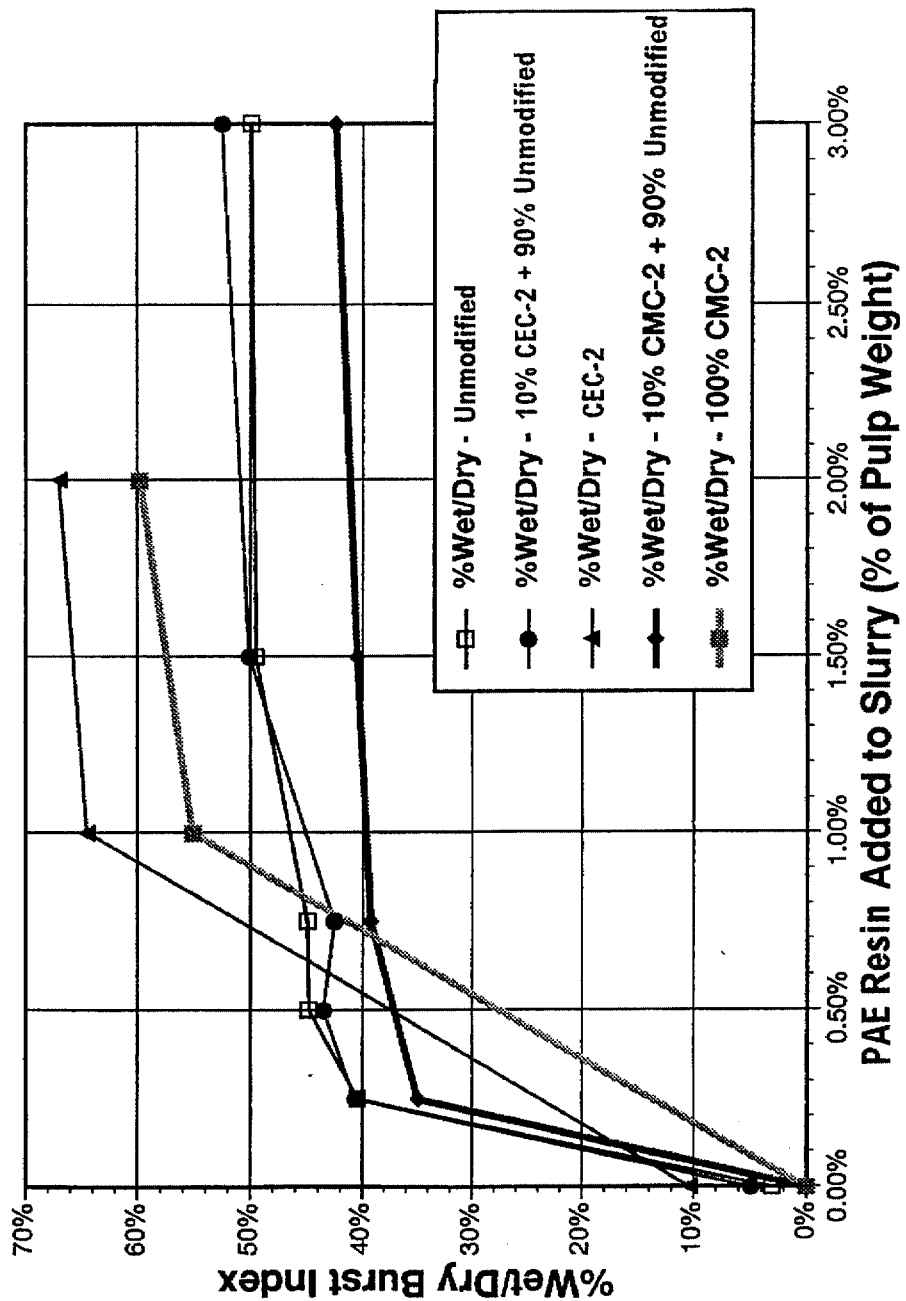
FIG. 8 is a graph, similar to FIGS. 6 and 7, showing the ratio of wet to dry burst strength for one each of the CEC and CMC pulps, and 10% blends of these fibers with untreated pulp, compared with untreated fiber, all refined to 475 CSF, at various levels of PAE wet strength resin addition.

The data shown in FIGS. 6–11 would seem to support the above hypothesis. FIGS. 6–9 show respectively dry burst, wet burst and the ratio of wet/dry burst strength for sheets made using 10% and 100% of the lower D.S. carboxyethylated and carboxymethylated materials of Examples 2 and 4 at different levels of PAE resin usage. Burst strength is a particularly important property for many paper products. In FIG. 6 the carboxyethylated and carboxymethylated fibers at 10% of the furnish had dry burst strengths about the same as a control sample of unmodified fiber at all levels of PAE addition. The carboxyethylated fibers were significantly stronger than the carboxymethylated fiber sheets at 100% modified fiber usage. FIG. 7, which gives wet burst results, shows that the carboxyethylated fiber was significantly superior at both levels of usage to its carboxymethylated counterpart. The sheets made with 100% carboxymethylated fiber and those made using only 10%, with the balance being unmodified fiber, again gave the poorest wet burst results at all levels of PAE usage. The 100% carboxyethylated sheets were the strongest while the 10% CEC blend and control samples gave nearly identical results. The ratios of wet burst compared to dry burst, shown in FIG. 8, again show the unexpected superiority of sheets made using the carboxyethylated fiber and blends of it with unmodified fiber over the equivalent carboxymethylated fiber sheets.

Figure 9:
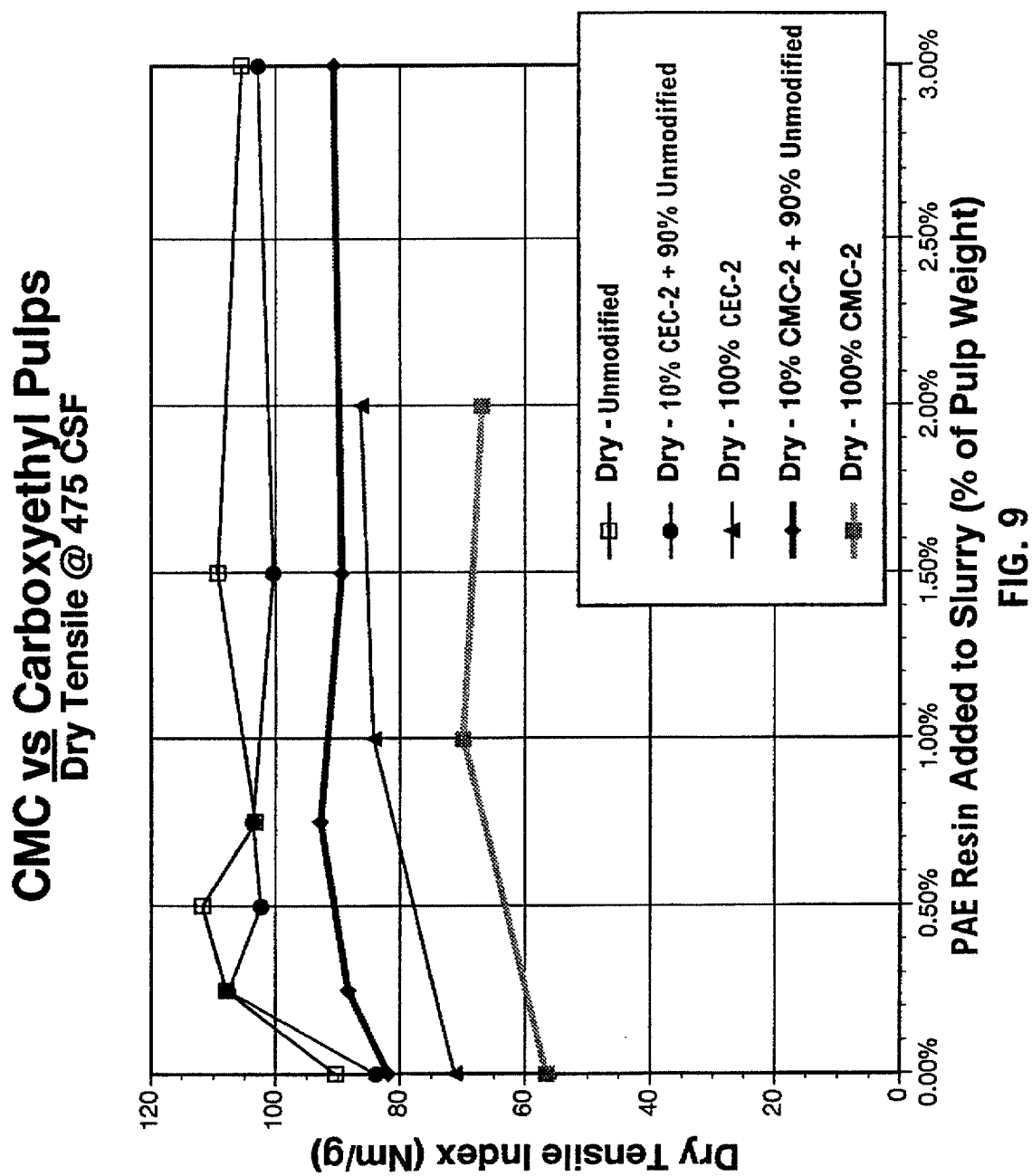
FIG. 9 is a graph showing dry tensile index of one each of the CEC and CMC pulps, and 10% blends of these fibers with untreated pulp, compared with untreated fiber, all refined to 475 CSF, at various levels of PAE wet strength resin addition.
Figure 10:
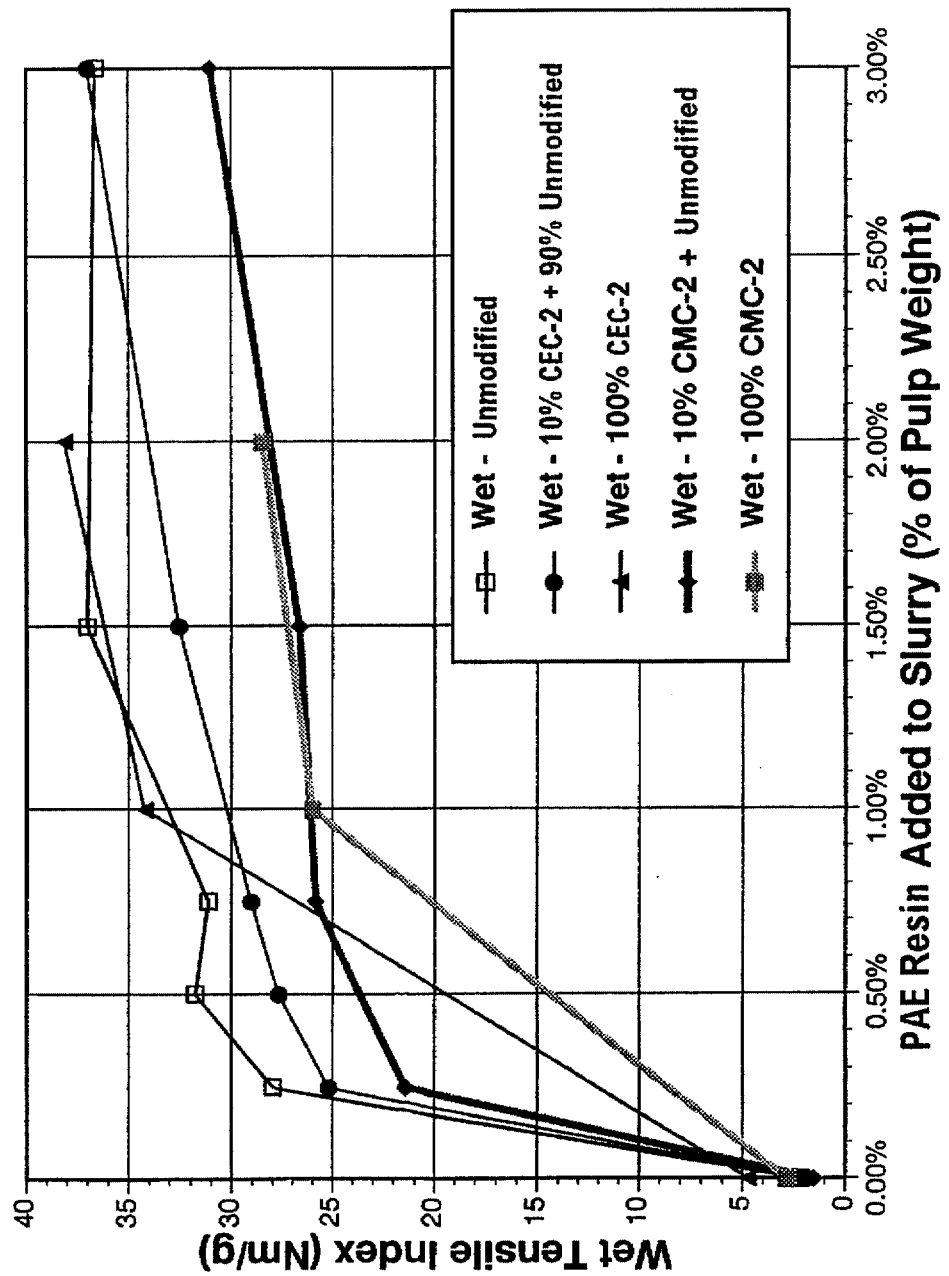
FIG. 10 is a graph, similar to FIG. 9, showing wet tensile index of one each of the CEC and CMC pulps, and 10% blends of these fibers with untreated pulp, compared with untreated fiber, all refined to 475 CSF, at various levels of PAE wet strength resin addition.

Tensile strength measurements, shown in FIGS. 9–11, indicate similar results to those seen when burst was the property measured. As seen in FIG. 9, dry tensile strength of the unmodified pulp sheets and the 10% carboxyethylated fiber sheets were very similar. However, the equivalent carboxymethylated samples had a consistently lower tensile index. When handsheets were made using 100% of the modified fibers the superiority of those made using carboxyethylated fiber is immediately evident. In FIG. 10, the 10% blend using CEC was very slightly lower than unmodified pulp in wet tensile values. However, the 100% carboxyethylated sheets were essentially equivalent to the unmodified material. Again the two levels of carboxymethylated fiber usage proved to be the poorest and were significantly lower than their carboxyethylated equivalents. The ratios of wet/ dry tensile index shown in FIG. 11 closely parallel the pattern seen for burst strength. At both 10% and 100% usage of substituted pulp, the carboxyethylated fiber had clearly superior ratios to its carboxymethylated counterpart. When equivalent fiber usages were compared the carboxyethylated material was always superior to the carboxymethylated material in wet/dry burst and tensile ratios.

Recycled fiber is presently a significant portion of the furnish used in many paper products and its use will inevitably increase in the future. There is always a strength loss from reuse of cellulose fibers. This occurs in part from loss of fiber length due to breakage during repulping and in part due to an apparently irreversible physical change in the fiber during its initial drying. Unfortunately, this loss of strength tends to offset the value of recycled fiber somewhat since heavier sheet weights are often needed to achieve required strength properties. Carboxyethylated fibers, used in conjunction with conventional papermaking fibers even in low percentages, have been found to partially or wholly offset this loss in strength on redrying. Previously dried recycled paper products with as little as 10% carboxyethylated fiber have strength properties that closely approach those of virgin fiber. Even lower quantities of carboxyethylated fiber contribute significant improvements. This will be shown in the following example.

EXAMPLE 6

Utilization of Carboxyethylated Cellulose Fibers for Improving Efficiency of Cationic Starch Another sample of carboxyethyl cellulose of somewhat higher substitution was prepared by the method described in Examples 1 and 2. This material had a carboxyl equivalent of 82 meq/100 g and an estimated D.S. of 0.133 and is referred to in the following table as CEC-3. Fiber with lower levels of carboxyethyl substitution would be expected to perform in similar manner A substantial sample of never dried unbleached kraft pulp was obtained from an Oregon pulp mill. This was made predominantly from a Douglas-fir furnish with an intended use as corrugated shipping container linerboard. The pulp was refined to a freeness of 600–650 CSF. One portion was sheeted on a Noble and Wood pilot scale fourdrinier machine to obtain a once-dried reference material. The once-dried fiber was then repulped and used to form 203× 203 mm (8×8 in) handsheets in a Noble and Wood laboratory sheet mold. Similar sheets were formed from the never dried material. These were to serve as reference samples for the following experiments in which cationic starch, the carboxyethylated cellulose, and the combination of these two materials were used as additives. The cationic starch was obtained from Western Polymer Co., Moses Lake, Wash. and is sold as Wescat EF cationic starch. Wescat is a trademark of Western Polymer Co. The cationic starch was used in all samples at a level of 2% by weight based on total fiber. This is typical of commercial usage where the starch is used primarily as a dry strength promoter. The carboxyethyl cellulose fiber was used at levels of 2.5%, 5.0% and 10.0% with and without the addition of the 2% cationic starch. All samples, other than the never dried control sheets, were made using once-dried fiber. Sheet properties are reported in following Table 1.

TABLE 1

| Sample | Basis Wt, g/m² | Caliper, mm | Density, kg/m³ | Tensile, kN/m | Z-Direction Tensile, pKa[1] | STFI, kN/m (50% R.H.)[2] | STFI, kN/m (90% R.H.)[2] |
|---|---|---|---|---|---|---|---|
| Never Dried | 298.3 | 0.55 | 543.3 | 12.1 | 331.0 | 6.6 | 3.2 |
| Once Dried | 286.5 | 0.64 | 445.4 | 7.4 | 150.2 | 4.5 | 2.3 |
| 2% Cat. Starch | 286.1 | 0.67 | 427.6 | 9.1 | 190.8 | 4.8 | 2.2 |
| 2.5% CEC-3 | 295.0 | 0.64 | 459.1 | 8.4 | 190.8 | 4.8 | 2.4 |
| 5.0% CEC-3 | 295.7 | 0.60 | 490.6 | 10.5 | 265.8 | 5.5 | 2.5 |
| 10.0% CEC-3 | 292.9 | 0.58 | 509.4 | 12.9 | 403.7 | 6.3 | 2.6 |
| 2.5% CEC-3 + 2% Cat. Starch | 291.1 | 0.65 | 451.7 | 10.6 | 224.5 | 5.4 | 2.4 |
| 5.0% CEC-3 + 2% Cat. Starch | 287.8 | 0.60 | 481.8 | 12.4 | 314.1 | 5.9 | 2.6 |
| 10% CEC-3 + 2% Cat. Starch | 288.8 | 0.57 | 508.2 | 15.5 | 453.5 | 6.9 | 3.0 |

[1]Sometimes called Internal Bond.
[2]Short span in plane compression strength, Tappi Method T-826.

It is readily apparent from the table that the addition of either cationic starch, carboxyethyl cellulose, or the combination of both results in generally increased physical properties over those of the once dried pulp without any additives. Use of 2.5% carboxyethyl cellulose alone gave almost identical physical properties to sheets with 2% cationic starch, the exception being a slightly lower tensile strength. In all cases, increasing the amount of the carboxyethyl cellulose in the furnish, with or without the cationic starch, produces increasingly strong papers. When 10% of the CEC-3 was incorporated into the furnish, either with or without starch, strength properties were essentially equivalent to those of sheets made with previously undried pulp. However, the effects of cationic starch and carboxyethyl cellulose appear to be additive. It is thus evident that addition of carboxyethylated cellulose fibers to conventional paper making fibers can increase strength and help to offset the normal loss of strength seen in recycled fiber.

It will be evident to those skilled in the art that many variations can be made in the procedures and products described in the present examples. These should be considered to fall within the spirit and scope of the invention if encompassed in the following claims.

We claim:

1. A paper or paper-like product which comprises:
    a fibrous, essentially water insoluble carboxyalkyl cellulose in which the alkyl group is at least two carbon atoms in length and the D.S. is in the range of 0.01–0.3 used in an amount of 2–100% of the dry weight of the fibers present;
    unsubstituted cellulose fibers in an amount of 98–0% of the dry weight of the fibers present; and
    a cationic additive selected from the group consisting of polyethyleneimine, cationic starch, and polyamide-epichlorohydrin resins, said additive being present in an amount of 0.1–4.0% based on total fiber.

2. The paper or paper-like product of claim 1 in which the carboxyalkyl cellulose has a pKa greater than 4.0.

3. The or paper or paper-like product of claim 1 in which the carboxyalkyl cellulose is carboxyethyl cellulose.

4. The paper or paper-like product of claim 1 in which the carboxyethyl cellulose has a D.S. in the range of 0.02–0.15.

5. The paper or paper-like product of claim 4 in which the carboxyethyl cellulose has a D.S. in the range of 0.025–0.10.

6. The paper-like product of claim 1 in which the cationic additive is a polyamide-epichlorohydrin resin.

7. The paper or paper-like product of claim 6 in which the product is an absorptive tissue or toweling.

8. The paper or paper-like product of claim 1 in which the cationic additive is cationic starch.

9. The paper or paper-like product of claim 8 in which the product is kraft linerboard.

10. A paper or paper-like product having an improved wet to dry burst strength ratio which comprises:
    a fibrous, essentially water insoluble carboxyethyl cellulose having a D.S. in the range of 0.01–0.3 in an amount of 2–100% of the dry weight of the fibers present;
    unsubstituted cellulose fibers in an amount of 98–0% of the dry weight of the fibers present; and
    a polyamide-epichlorohydrin resin present in an amount of 0.1–4.0% based on total fiber.

* * * * *